US012600823B2

(12) United States Patent
Uyanga et al.

(10) Patent No.: US 12,600,823 B2
(45) Date of Patent: Apr. 14, 2026

(54) HYDROGEL PREPARATION, METHOD OF FORMING SAME AND METHOD OF COATING A FABRIC

(71) Applicant: YEE TUNG GARMENT COMPANY LIMITED, Kwai Chung (HK)

(72) Inventors: Kindness Alfred Uyanga, Kowloon (HK); Yuwanda Iamphaojeen, Kowloon (HK); Weilu Li, Kowloon (HK); Walid Daoud, Kowloon (HK)

(73) Assignee: YEE TUNG GARMENT COMPANY LIMITED, Kwai Chung (HK)

( * ) Notice: Subject to any disclaimer, the term of this patent is extended or adjusted under 35 U.S.C. 154(b) by 742 days.

(21) Appl. No.: 18/060,775

(22) Filed: Dec. 1, 2022

(65) Prior Publication Data

US 2024/0182650 A1 Jun. 6, 2024

(51) Int. Cl.

| | |
|---|---|
| ***C08J 3/075*** | (2006.01) |
| ***C08J 3/24*** | (2006.01) |
| ***C08K 3/28*** | (2006.01) |
| ***D06M 15/05*** | (2006.01) |

(52) U.S. Cl.

CPC ................. *C08J 3/075* (2013.01); *C08J 3/24* (2013.01); *C08K 3/28* (2013.01); *D06M 15/05* (2013.01); *C08J 2301/02* (2013.01); *D10B 2201/02* (2013.01)

(58) Field of Classification Search

None

See application file for complete search history.

(56) References Cited

U.S. PATENT DOCUMENTS

| | | | | |
|---|---|---|---|---|
| 4,209,413 | A * | 6/1980 | Kent | C09K 5/063 126/400 |
| 4,273,667 | A * | 6/1981 | Kent | C09K 5/063 126/400 |
| 4,935,022 | A * | 6/1990 | Lash | A61F 13/53747 604/375 |
| 9,468,902 | B1 * | 10/2016 | Atta | C01G 9/02 |
| 2016/0002457 | A1 * | 1/2016 | Hamad | C08F 2/44 523/333 |
| 2017/0367947 | A1 * | 12/2017 | Rege | A61K 8/21 |

OTHER PUBLICATIONS

Topography and physical properties of carboxymethyl cellulose films assembled with calcium and gelatin at different temperatures and humidity, He et al., Food Chemistry, 382, 2022, 132391. (Year: 2022).*

* cited by examiner

*Primary Examiner* — Peter A Salamon

(74) *Attorney, Agent, or Firm* — Francis J. Maguire; WARE FRESSOLA MAGUIRE & BARBER LLP

(57) ABSTRACT

A hydrogel preparation 10 is disclosed as including carboxymethyl cellulose (CMC) 12, fumaric acid 14, a plurality of cavities 16 formed by the CMC and the fumaric acid, and zinc oxide 26 and/or xylitol 24 within the cavities.

9 Claims, 3 Drawing Sheets

HYDROGEL PREPARATION, METHOD OF FORMING SAME AND METHOD OF COATING A FABRIC

FIELD OF THE INVENTION

This invention relates to a hydrogel preparation, a method of forming a hydrogel preparation, a method of coating a fabric, and a fabric coated with such a hydrogel preparation.

BACKGROUND OF THE INVENTION

With global warming, there are more hot days and heat waves, and higher temperatures increase heat-related illnesses and can make it more difficult to work and move around. Some measures have been proposed or practised with a view to countering such increased hotness. For example, there are electrical fans suitable to be worn around a user's neck to drive air towards the user's neck or to be carried by a user at the waist band of a pant or a pair of trousers so as to drive air into the inside of the upper wear (e.g. T-shirt) of the user. However, as these appliances are powered by electric batteries, they cannot operate for long without replacing or recharging the batteries. It is also possible that electric power may run out during use, in which case the appliances would have to stop operation if there are no readily available electric batteries or power recharging equipment.

It is thus an objective of the present invention to provide a hydrogel preparation, a method of forming a hydrogel preparation, a method of coating a fabric, and a fabric coated with such a hydrogel preparation, in which the aforesaid shortcoming is mitigated or at least to provide a useful alternative to the trade and public.

SUMMARY OF THE INVENTION

According to a first aspect of the present invention, there is provided a hydrogel preparation including carboxymethyl cellulose (CMC), a cross-linking agent, a plurality of cavities formed by said CMC and said cross-linking agent, and at least an endothermic agent within one of said plurality of cavities.

According to a second aspect of the present invention, there is provided a method of forming a hydrogel preparation including mixing carboxymethyl cellulose (CMC), a cross-linking agent and an endothermic agent to form a hydrogel solution.

According to a third aspect of the present invention, there is provided a method of coating a fabric, including coating a fabric with a hydrogel preparation including carboxymethyl cellulose (CMC), a cross-linking agent, a plurality of cavities formed by said CMC and said cross-linking agent, and at least an endothermic agent within one of said plurality of cavities.

According to a fourth aspect of the present invention, there is provided a fabric coated with a hydrogel preparation including carboxymethyl cellulose (CMC), a cross-linking agent, a plurality of cavities formed by said CMC and said cross-linking agent, and at least an endothermic agent within one of said plurality of cavities.

BRIEF DESCRIPTION OF THE DRAWINGS

A hydrogel preparation, a method of forming a hydrogel preparation, a method of coating a fabric, and a fabric coated with a hydrogel preparation according to embodiments of the present invention will now be described, by way of examples only, with reference to the accompanying drawings, in which.

DESCRIPTION OF THE EMBODIMENTS

Figure 1:
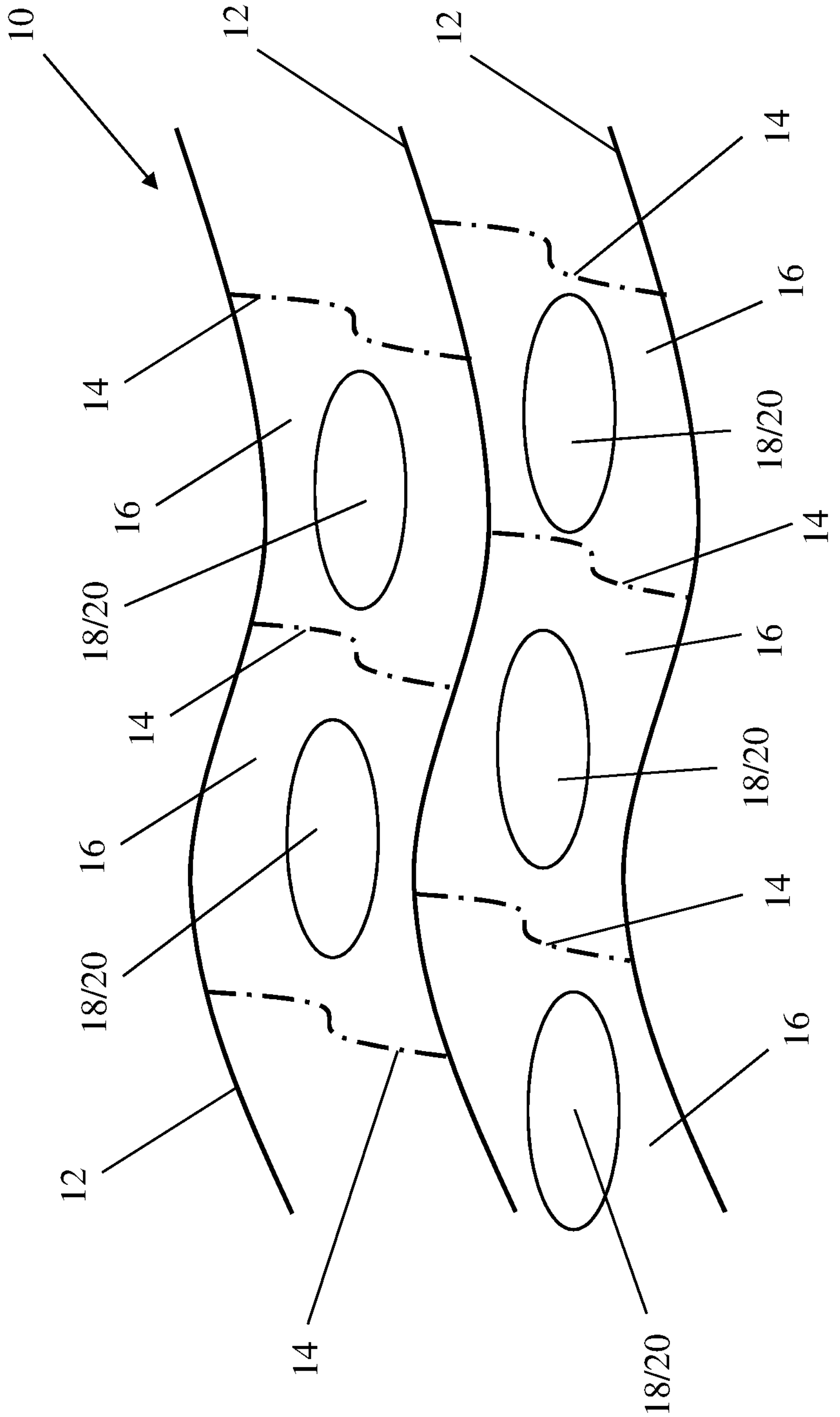
FIG. 1 is a schematic view of a hydrogel preparation according to an embodiment of the present invention.

Referring to FIG. 1, a hydrogel preparation according to an embodiment of the present invention, generally designated as 10, is formed by a number of chains of carboxymethyl cellulose (CMC) 12 criss-crossed by a number of chains of a cross-linking agent, in particular fumaric acid 14.

Carboxymethyl cellulose (CMC) (also called cellulose gum) is a cellulose derivative with carboxymethyl groups ($-CH_2-COOH$) bound to some of the hydroxyl groups of the glucopyranose monomers that make up the cellulose backbone. A general structural formula of CMC is as follows:

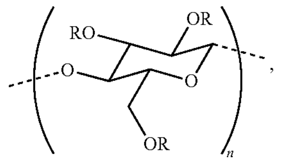

wherein R is H or $CH_2-COOH$.

Fumaric acid 14 is an organic compound with the formula $HO_2CCH{=}CHCO_2H$, and the following structural formula:

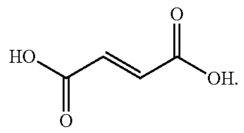

The fumaric acid 14 acts as the cross-linking agent to link up the chains of CMC 12 to one another.

In the hydrogel preparation 10, a number of cavities 16 are formed by the CMC chains 12 and fumaric acid 14. The cavities 16 contain a heat-reflecting agent 18 and/or an endothermic agent 20.

The heat-reflecting agent 18 may be a metal oxide which reflects near-infrared (NIR) radiation, such as zinc oxide (ZnO) and titanium dioxide ($TiO_2$). Solar heat energy is mainly generated in the wavelength range of 700-1,100 nm, which is within the NIR radiation region. The solar thermal energy absorbed by human body results in heat gain and causes increase of body temperature, making people feel hot. NIR reflective materials have proven to have significant cooling effect by reflecting incident solar radiation as well as minimizing the transfer of heat to human body. For example, ZnO has demonstrated the ability to reflect NIR radiation in the wavelength range of 700-2,500 nm.

The endothermic agent 20 contained by the cavities 16 may be a sugar alcohol. The term "endothermic agent" here means a compound, mixture or substance which absorbs thermal energy from its surroundings when dissolved in water (e.g. upon absorption of sweat), thus leading to a decrease of the temperature of the surroundings.

Sugar alcohols are also called polyhydric alcohols, polyalcohols, alditols or glycitols, and are organic compounds typically derived from sugars, containing one hydroxyl group (—OH) attached to each carbon atom, with general formula $HOCH_2(CHOH)_nCH_2OH$. Sugar alcohol is one of the most common endothermic agents. Of the various sugar alcohols, xylitol and erythritol are known to be good heat-absorbing substances.

Xylitol is a chemical compound with the formula $HO(CH_2)(CHOH)_3(CH_2)OH$, and the following structural formula:

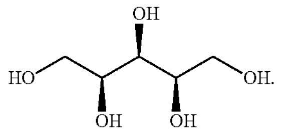

As for erythritol, such is with the formula $HO(CH_2)(CHOH)_2(CH_2)OH$, and the following structural formula:

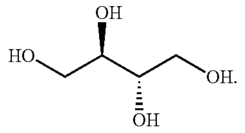

Figure 2:
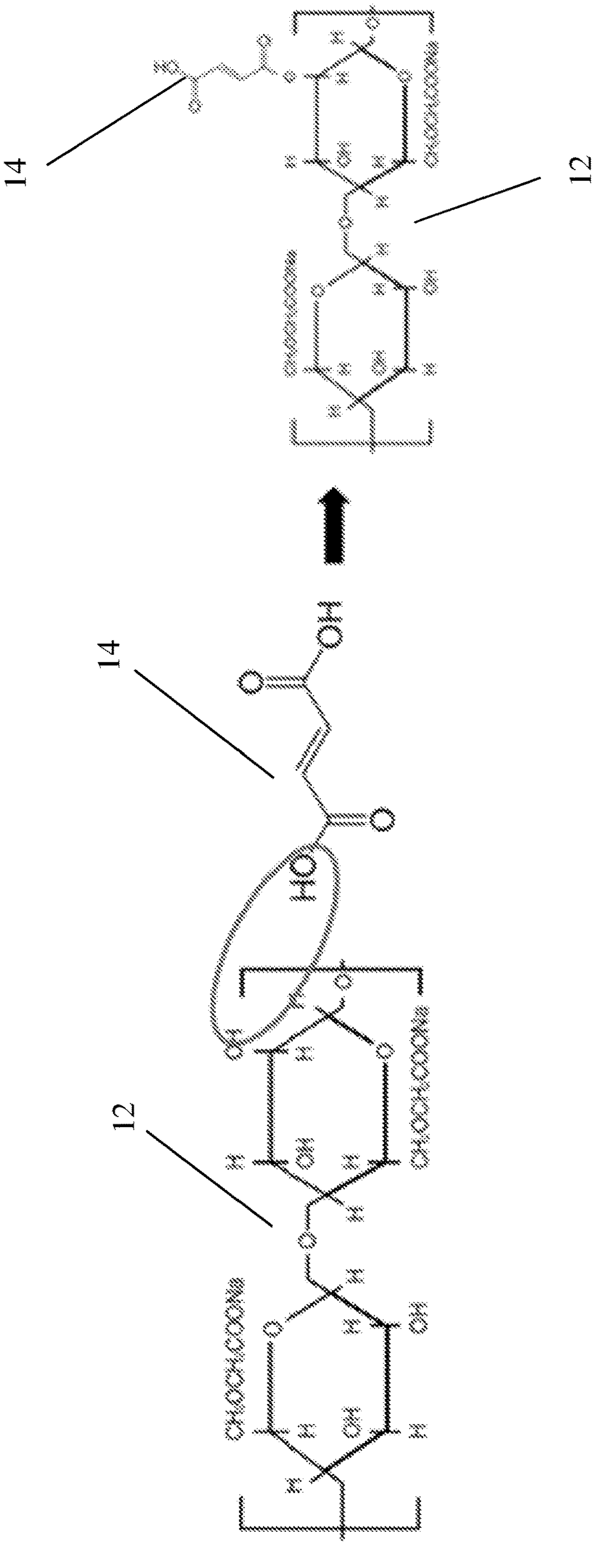
FIG. 2 shows schematically the bonding of a fumaric acid molecule with a carboxymethyl cellulose (CMC) chain.

As shown in FIG. 2, in the formation of the hydrogel preparation 10, fumaric acid molecules 14 are bonded with CMC chains 12 to link the CMC chains 12 to one another.

Figure 3:
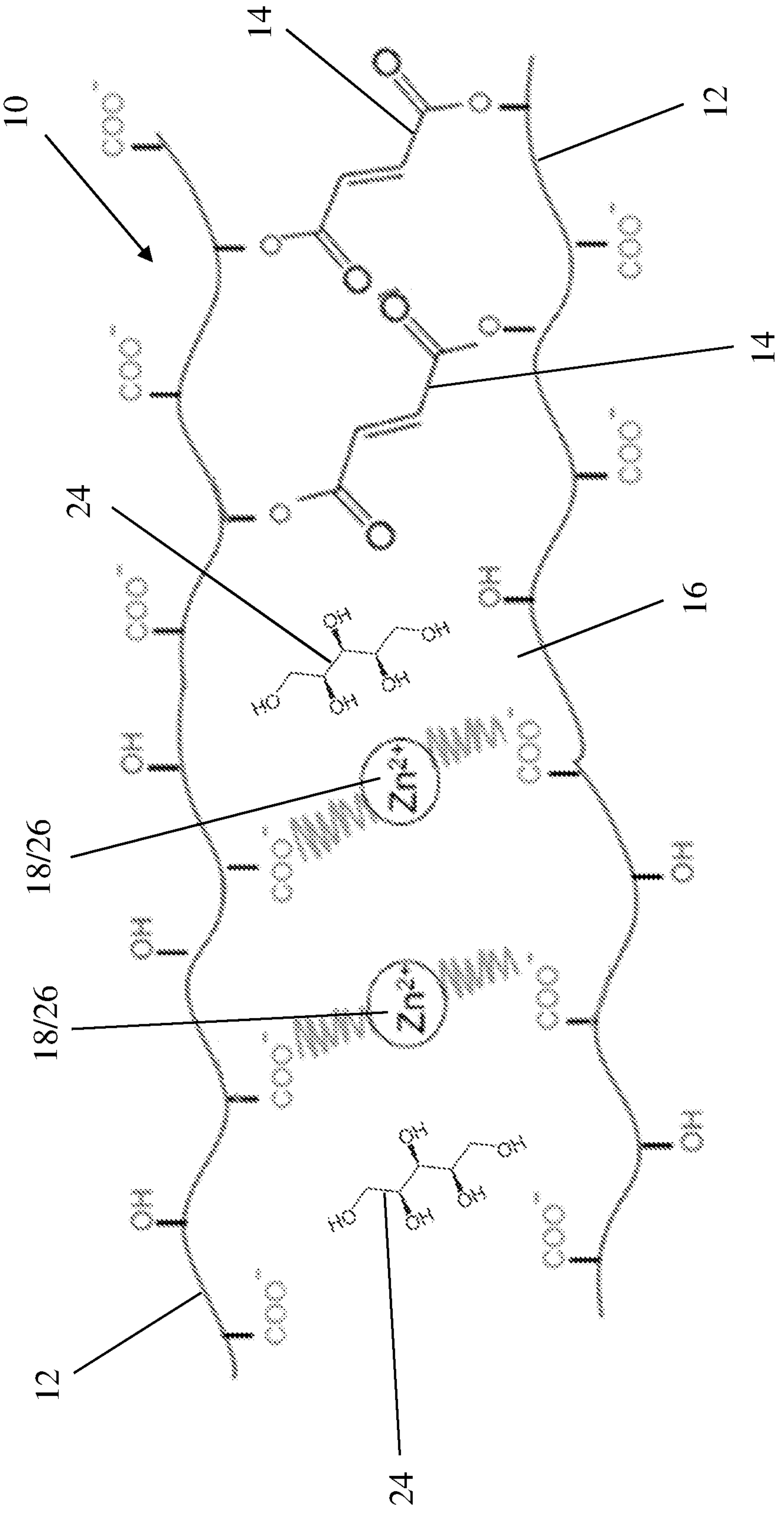
FIG. 3 is a schematic view of a hydrogel preparation according to a further embodiment of the present invention.

FIG. 3 is a schematic view of a hydrogel preparation 10 according to an embodiment of the present invention, showing two CMC chains 12 joined by two cross-linking fumaric acid molecules 14. Within a cavity 16 formed by the CMC chains 12 and fumaric acid molecules 14 are contained a number of xylitol molecules 24 and zinc oxide 26 (represented by zinc ions ($Zn^{2+}$)).

The hydrogel preparation 10 is in the form of a hydrogel, which means that it is a crosslinked hydrophilic polymer that does not dissolve in water. Such is an advantageous characteristic in the present invention, in particular since xylitol is highly soluble in water. The hydrogel structure maintains the heat-reflecting agent (such as ZnO and $TiO_2$) and the endothermic agent 20 (such as xylitol and erythritol) in positon, and prevents such substances from leaking out after absorbing the sweat. The hydrogel structure also provides the cavities 16 for containing the heat-reflecting agent and the endothermic agent 20, which provides the durable washing performance.

As an example, to form the hydrogel preparation 10 in solution form, 3.135 gm of carboxymethyl cellulose (CMC) was dissolved in 625 ml of distilled water at room temperature to form a CMC solution. 6.25 gm of xylitol was dissolved in 156 ml of distilled water to form a xylitol solution, and 0.469 gm of fumaric acid was dissolved in 156 ml of distilled water to form a fumaric acid solution. Then 4.644 gm of zinc nitrate hexahydrate was dissolved in 62.5 ml of distilled water to form a zinc nitrate hexahydrate solution.

The CMC solution, the fumaric acid solution and the xylitol solution were mixed together, and the zinc nitrate hexahydrate solution was added to form the hydrogel preparation 10. In particular, in the process of forming the hydrogel preparation 10, zinc nitrate hexahydrate undergoes decomposition to form zinc oxide and nitrogen dioxide, as follows, thus providing zinc oxide to the hydrogel preparation 10:

$$Zn(NO_3)_2 \rightarrow ZnO + NO_2$$

The hydrogel preparation 10 may be used as a coating for a fabric. The fabric may be made partly or entirely of a natural fibre. In particular, the fabric may be made of cotton.

A process of coating a fabric with the hydrogel preparation 10 will be discussed by taking a piece of cotton fabric as an example. A piece of cotton fabric was scoured by being soaked in 2 g/L nonionic detergent (Kieralon wash F-OLB, BASF) and stirred at 80° C. for 30 minutes, then rinsed with water and dried at 80° C.

The scoured cotton fabric was dipped in the as-prepared hydrogel preparation 10 for 5 minutes. The fabric was then pressed using a padder at a pressure of 0.65 MPa and roller rotation speed of 7.5 rpm. The fabric was then dried at 80° C. for 10 minutes and cured at 120° C. for 3 minutes. These steps may be carried out by stenter (also called a stenter machine), which is machine used in the textile industry for drying and heat treating fabric after wet processing. The coated cotton fabric was then washed with water and dried at 80° C.

It should be understood that the above only illustrates and describes examples whereby the present invention may be carried out, and that modifications and/or alterations may be made thereto without departing from the spirit of the invention.

It should also be understood that various features of the invention which are, for brevity, described in the context of a single embodiment, may be provided separately or in any suitable sub-combination.

What is claimed is:

1. A hydrogel preparation including:

carboxymethyl cellulose (CMC), a cross-linking agent, a plurality of cavities formed by said CMC and said cross-linking agent, and at least an endothermic agent within one of said plurality of cavities, said hydrogel preparation further including at least a heat-reflecting agent within one of said plurality of cavities, wherein said heat-reflecting agent is a metal oxide, and wherein said metal oxide is titanium dioxide.

2. The preparation of claim 1, wherein said cross-link agent is fumaric acid.

3. The preparation of claim 1, wherein said endothermic agent is a sugar alcohol.

4. The preparation of claim 3, wherein said sugar alcohol is xylitol or erythritol.

5. A method of forming a hydrogel preparation including:

mixing carboxymethyl cellulose (CMC), a cross-linking agent and an endothermic agent to form a hydrogel solution, said method further including:

forming a metal oxide in said hydrogel solution, wherein said metal oxide is titanium dioxide.

6. The method of claim 5, wherein said carboxymethyl cellulose (CMC), said cross-linking agent and said endothermic agent are in the form of solutions.

7. The method of claim 5, wherein said cross-link agent is fumaric acid.

8. The method of claim 5, wherein said endothermic agent is a sugar alcohol.

9. The method of claim 8, wherein said sugar alcohol is xylitol or erythritol.

* * * * *